(12) United States Patent
Laird

(10) Patent No.: US 8,770,610 B2
(45) Date of Patent: *Jul. 8, 2014

(54) AXLES, SUCH AS FOR BICYCLES

(75) Inventor: Andrew Laird, Los Gatos, CA (US)

(73) Assignee: Fox Factory, Inc., Scotts Valley, CA (US)

( * ) Notice: Subject to any disclaimer, the term of this patent is extended or adjusted under 35 U.S.C. 154(b) by 67 days.

This patent is subject to a terminal disclaimer.

(21) Appl. No.: 13/343,338

(22) Filed: Jan. 4, 2012

(65) Prior Publication Data

US 2012/0104839 A1    May 3, 2012

Related U.S. Application Data

(60) Continuation of application No. 12/794,269, filed on Jun. 4, 2010, now Pat. No. 8,091,909, which is a continuation of application No. 12/362,654, filed on Jan. 30, 2009, now Pat. No. 7,731,214, which is a division of application No. 11/674,471, filed on Feb. 13, 2007, now abandoned.

(51) Int. Cl.
*B62K 25/28* (2006.01)

(52) U.S. Cl.
USPC ........................................ 280/279; 301/124.2

(58) Field of Classification Search
USPC ................ 280/279, 276; 301/110.5, 124.2
See application file for complete search history.

(56) References Cited

U.S. PATENT DOCUMENTS 2,829,431 A    4/1958   Brauchler
3,153,491 A *  10/1964  Mactavish et al. ............ 220/770
4,361,360 A    11/1982  Kuether
4,424,981 A    1/1984   Maxwell, III
4,632,415 A    12/1986  San Hai
4,763,957 A    8/1988   Poehlmann et al.
5,257,855 A    11/1993  Nagano
5,549,315 A    8/1996   Ashman
5,622,412 A    4/1997   Yamane (Continued)

FOREIGN PATENT DOCUMENTS

GB    1 336 620         11/1973
GB    2 414 971 A       12/2005
WO    WO 98/50268       11/1998
WO    WO 2004/024366    3/2004

OTHER PUBLICATIONS

Rockshox Psylo U-Turn Service Guide, pp. 8-10 (2002).
Photo taken Feb. 2007: Front axle from a 2005 Honda CRF250X.

*Primary Examiner* — Tony Winner
(74) *Attorney, Agent, or Firm* — Patterson & Sheridan, LLP; David M. Haugen

(57) ABSTRACT

A suspension for a two-wheeled vehicle includes first and second fork legs. Each fork leg includes a dropout. Each dropout has an opening therethrough. At least a portion of one of the openings is threaded. Each of the dropouts includes a split-clamp pinch bearing defining the opening and operable between an open position and a locked position, and a hand operable actuator pivoted to the bearing for operation thereof. The suspension further includes a one-piece axle. The axle is disposed through the openings. The axle has a threaded first end engaged with the threaded portion. The axle has an ergonomic grip formed at a second end. The bearing tightly engages an outer surface of the axle in the locked position, thereby rotationally coupling the axle to the dropout.

19 Claims, 6 Drawing Sheets

(56) References Cited

U.S. PATENT DOCUMENTS

| | | | |
|---|---|---|---|
| 5,626,401 A | 5/1997 | Terry, Sr. et al. | |
| 5,909,931 A | 6/1999 | Tabe | |
| 5,984,423 A | 11/1999 | Becker | |
| 6,089,675 A * | 7/2000 | Schlanger | 301/124.2 |
| 6,109,635 A | 8/2000 | Maeda et al. | |
| 6,412,803 B1 | 7/2002 | Lalikyan et al. | |
| 6,581,494 B2 | 6/2003 | Sechler | |
| 6,886,894 B2 | 5/2005 | Kanehisa et al. | |
| 6,964,425 B2 | 11/2005 | Turner | |
| 7,090,308 B2 * | 8/2006 | Rose et al. | 301/110.5 |
| 7,155,824 B2 | 1/2007 | Prucher | |
| 7,412,866 B2 | 8/2008 | Jahani et al. | |
| 7,494,145 B2 | 2/2009 | Schroeder et al. | |
| 7,537,291 B2 | 5/2009 | Hara | |
| 2013/0328385 A1 * | 12/2013 | Kuo | 301/124.2 |

* cited by examiner

AXLES, SUCH AS FOR BICYCLES

CROSS-REFERENCE TO RELATED APPLICATIONS

This application is a continuation of U.S. patent application Ser. No. 12/794,269, filed Jun. 4, 2010, now U.S. Pat. No. 8,091,909 issued Jan. 10, 2012, which is a continuation of U.S. patent application Ser. No. 12/362,654, filed Jan. 30, 2009, now U.S. Pat. No. 7,731,214, issued Jun. 8, 2010, which is a divisional of U.S. patent application Ser. No. 11/674,471, filed Feb. 13, 2007, now abandoned. Each of the aforementioned related patent applications is incorporated herein by reference in their entirety.

FIELD OF THE INVENTION

The invention is generally directed to the field of axles for two-wheeled vehicles. The invention is especially directed to the field of bicycle axles especially suitable for use in high stress and/or competitive applications, such as downhill, extreme, and free riding.

All patents, patent applications, and other publications, referred to herein are incorporated by reference in their entirety into this patent application.

BACKGROUND OF THE INVENTION

Today's high performance two-wheeled vehicle is often subjected to extreme riding conditions. Accordingly, riders expect precise steering, robust construction, and improved resistance to torsional and shear forces.

Therefore, designers seek improvements to, for example, axle technology and how axles are retained to vehicle frames.

For example, in U.S. Pat. No. 4,632,415 (San Hai), the fork ends have bearings for receiving a spindle that supports a wheel hub. The spindle is one piece and has threads on one end that, when the spindle is supported by its bearings, projects out of its bearing. A nut is then threaded onto the threaded end of the spindle to secure the spindle to the front fork. The fact that the non-threaded, enlarged end of San Hai's spindle appears to have a screwdriver slot implies this design was not meant for tool-free use and was certainly not ergonomically designed.

In U.S. Pat. No. 6,109,635 (Maeda), a motorcycle axle having a threaded end for engaging an axle nut is described. The axle nut is then clamped in a split-clamp axle holder. However, the threads of the axle never engage complementary threads of the axle holder, since there are no such complementary threads.

In U.S. Pat. No. 6,412,803 (Lalikyan), an inverted front fork and wheel assembly for bicycles and motorcycles includes an axle having non-circular end portions that are clamped within corresponding non-circular dropout openings, thereby to increase the torsional stiffness of the fork.

In U.S. Pat. No. 6,886,894 (Kanchisa), a hub axle is provided that is preferably a one-piece unitary member made from a suitable rigid material. Similar to the '415 patent mentioned above, the hub axle has threads on one end that, when the hub axle is supported by its bearings, projects out of its bearing. A nut is then threaded onto the threads of the end of the hub axle to secure the hub axle to the front fork. Also, as with the '415 patent, the fact that the enlarged end of Kanchisa's head portion is described as being a tool engaging portion, implies this design was not meant for tool-free use and was also certainly not ergonomically designed.

In U.S. Pat. No. 7,090,308 (Rose), a multi-component axle assembly for mounting a wheel to a vehicle is described. The tubular body, while having a threaded end for engaging complementary threads in one of the dropouts, has at least one slot in each end that allows radial deformation of the tubular body when the clamp lever is placed in the clamping position.

In the Rockshox TULLIO (™) system (see 2002 Rockshox Psylo U-Turn Service Guide, pp. 8-10), a simply machined tubular axle member had a threaded bearing end for capture in a threaded split-clamp pinch-bearing and a separate smooth bearing end for capture in a smoothly machined split-clamp pinch bearing. The TULLIO system included a lever for rotating the axle so that the threads of the TULLIO axle can be captured by the complementary threads of the split-clamp pinch bearing. The lever, during non-use, was pivoted until it was parallel with the longitudinal axis of the axle and then pushed into a stowed position inside the lever-retaining component. The lever-retaining component was screwed into the smooth bearing end of the tubular axle member making the TULLIO system a multi-component axle assembly. Clamps were used for opening and closing the split-clamp pinch bearings. The TULLIO system is also described in GB 2,414, 971 (Bartlett).

While in GB 1,336,620 (Mannesmannrohren-Werke GMBH), a method of forming a generic axle (no application mentioned) using forging of a hollow tube is described, there appears to have been little discussion in the prior art about the methods used to manufacture motorcycle or bicycle axles and how those methods may be integrated into the axle assembly process (e.g. axle attachment to vehicle).

Some common prior art methods for manufacturing motorcycle or bicycle axles include machining a tubular or solid metallic extrusion or billet and internally and externally swaging and forming from steel tube stock. These methods are not necessarily cost effective. Additionally, these methods do not easily lead to one-piece and ergonomically shaped end products.

Accordingly, there is room for improvement within the art.

DETAILED DESCRIPTION OF THE DRAWINGS

Introduction

This patent application describes the invention in the context of an exemplary embodiment of a front axle for a bicycle and how that exemplary axle is mounted to an exemplary front bicycle suspension fork. However, the teachings and scope of the invention—especially as related to the manufacture of the axle body, itself—are equally applicable to a front or rear wheel of any two-wheeled vehicle.

Basic Axle Structure

Figure 1:
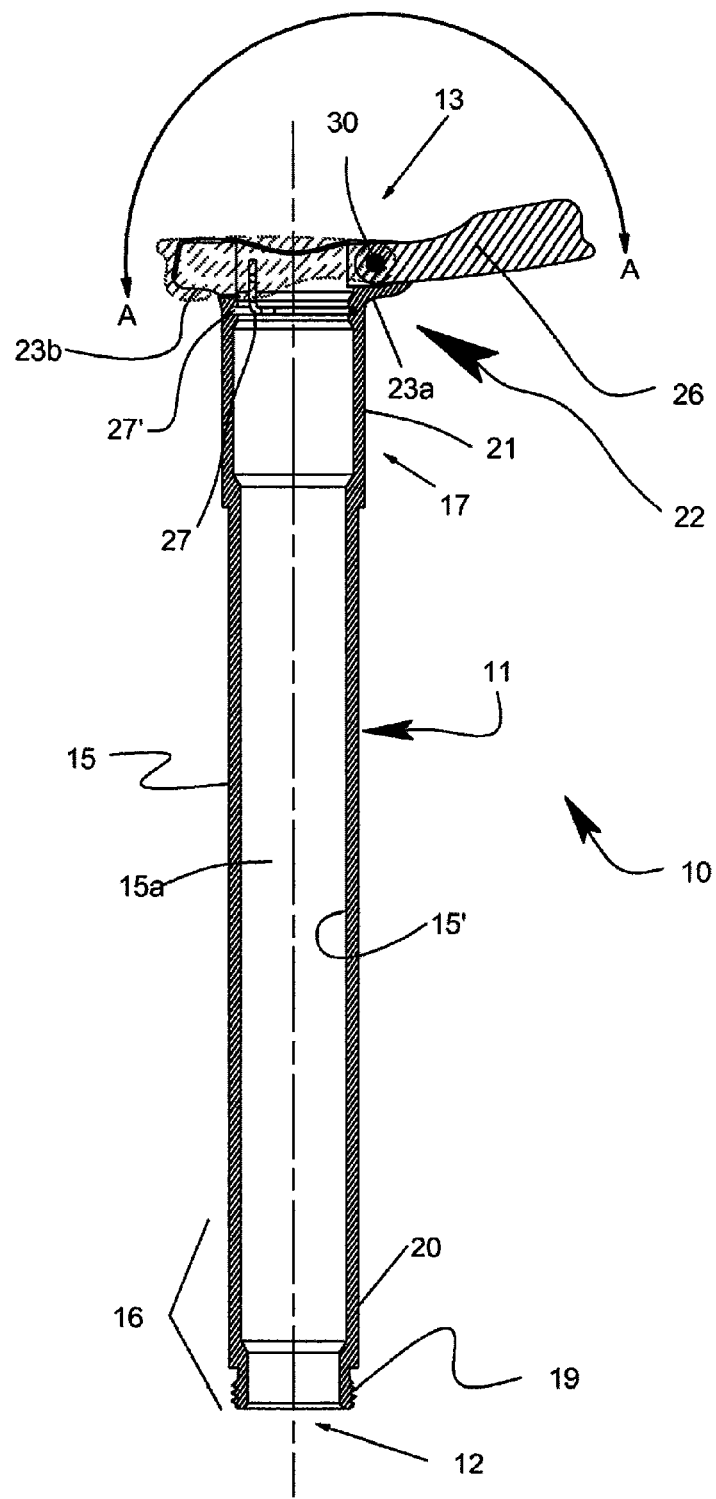
FIG. 1 depicts a cross-section of an axle according to an exemplary embodiment of the invention.

FIG. 1 depicts a cross-section of an axle assembly 10 according to an exemplary embodiment of the invention. Axle assembly 10 includes an axle body 11 having a first end 12 and a second end 13 connected by an elongated tubular body portion 15. The inner wall 15' of tubular body portion 15 defines a through bore 15a. As will be described below, the first and second ends 12, 13, will be processed differently during the manufacture of axle body 11 and have different structures. However, they will still be parts of a unitary (one-piece) axle body. Positioned between the first end 12 and the second end 13 are a first bearing portion 16 and a second bearing portion 17 for mounting in first and second dropouts, respectively (see discussion of FIGS. 2A-2C below). As will be described below and for the beneficial reasons described below, according to the preferred embodiment of the invention, axle body 11 will be forged from a single solid metallic work piece. Typically, the metallic work piece will be a piece of aluminum. However, other materials may be used.

First bearing portion 16 includes threads 19 positioned adjacent the first end 12 of the axle body 11 and a smooth bearing surface 20 inwardly spaced from threads 19 and the first end 12 of axle body 11. Threads 19 are for mounting in complementary threads 101 in a corresponding threaded dropout 99 (see FIG. 2A).

Second bearing portion 17 includes an enlarged diameter (relative to the first bearing surface 20) smooth bearing surface 21 for insertion into a corresponding non-threaded and smooth dropout 98 (see discussion of FIGS. 2A-C below).

Figure 6:
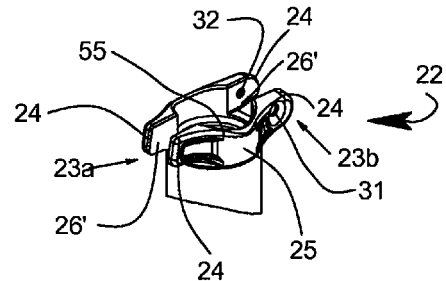
FIG. 6 depicts the grip portion of the exemplary axle after some basic machining steps.

The second end 13 of axle body 11 includes an ergonomically designed grip portion 22. Grip portion 22 may include first and second opposed wings 23a, 23b, extending outward from the longitudinal axis of the axle body 11 beyond the bearing surfaces of axle body 11. Accordingly, under such conditions, the wings 23a, 23b would be the widest portion of axle body 11. As shown in FIG. 6, wings 23a, 23b have smoothened ends 24 and are shaped, such that in combination with sweeping curved surfaces 25, grip portion 22 is ergonomically shaped to be comfortable to hold and allow easy and comfortable tool-free mounting of axle assembly 10 to its corresponding dropouts.

A lever 26 may be provided for rotating axle assembly 10 about is longitudinal axis so that the threads 19 of axle assembly 10 may interlock with the threads of the dropout 99. Lever 26 may be pivotable (see curved arrow A-A of FIG. 1) about a fixed pivot point, such as a fastener 30, positioned on wing 23a, between at least first and second positions. In lever 26's first position (solid), lever 26 is in its operable position to assist in rotating axle assembly 10 about its longitudinal axis. In lever 26's second position (shadow), lever 26 has been pivoted into its stowed position in a lever recess 26' (see e.g. FIG. 6 for best view) and is retained in the stowed position by a clip ring 27.

Figure 8A:
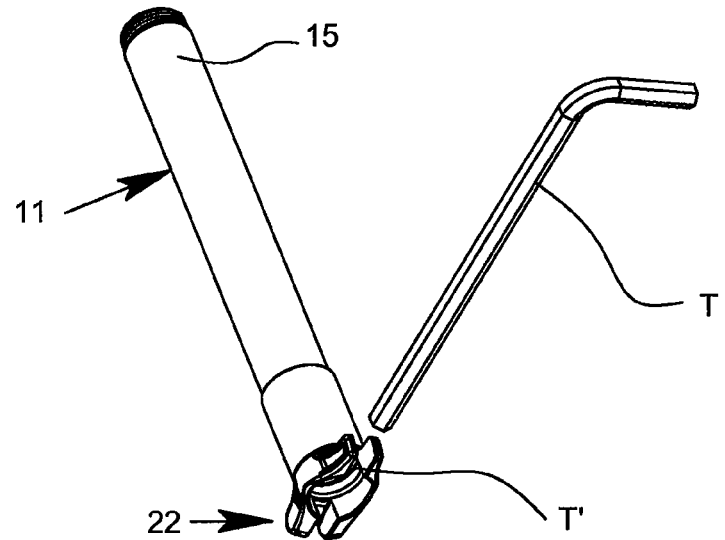
FIG. 8A and FIG. 8B depict an alternative embodiment of an axle according to the invention.
Figure 8B:
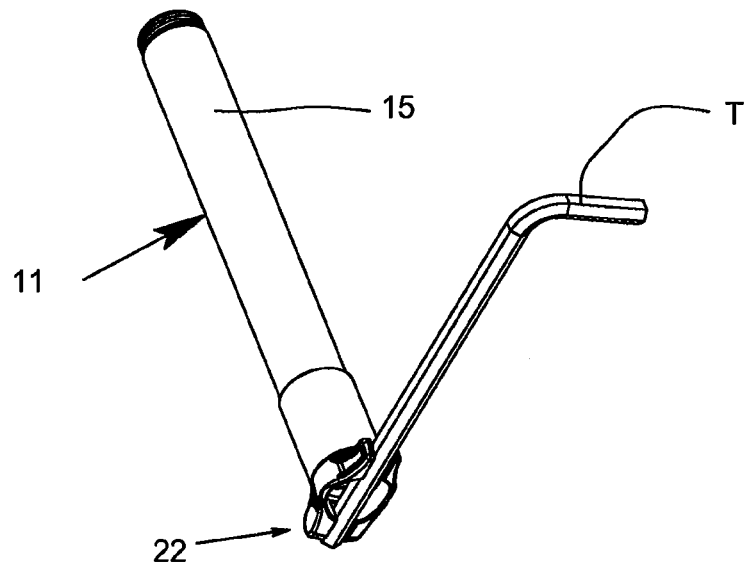

In applications where tool-free mounting of axle assembly 10 is not important, as shown in FIG. 8A, 8B, it is possible to insert any known external tool T into a tool-receiving portion T' defined by grip portion 22.

Whether lever 26 or an external tool T is used, grip portion 22 and tubular body 15 remain a one-piece axle body 11. This one-piece construction reduces production costs as well as opportunities for the axle components to separate when subjected to extreme forces. Thus, the current exemplary one-piece design is more robust and useful in high-stress applications than prior art multi-component designs.

Exemplary Use of Axle

Figure 2A:
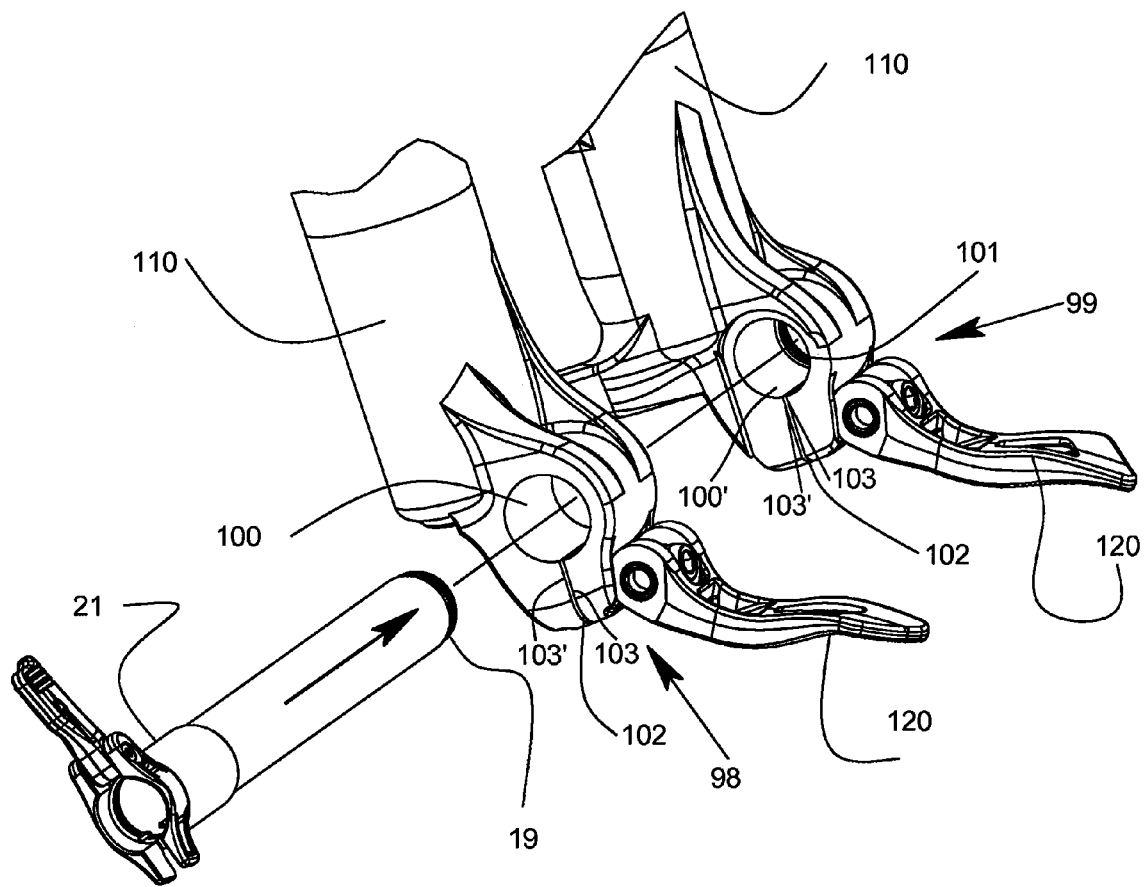
FIGS. 2A, 2B, and 2C depict an exemplary use for the exemplary axle of FIG. 1.
Figure 2B:
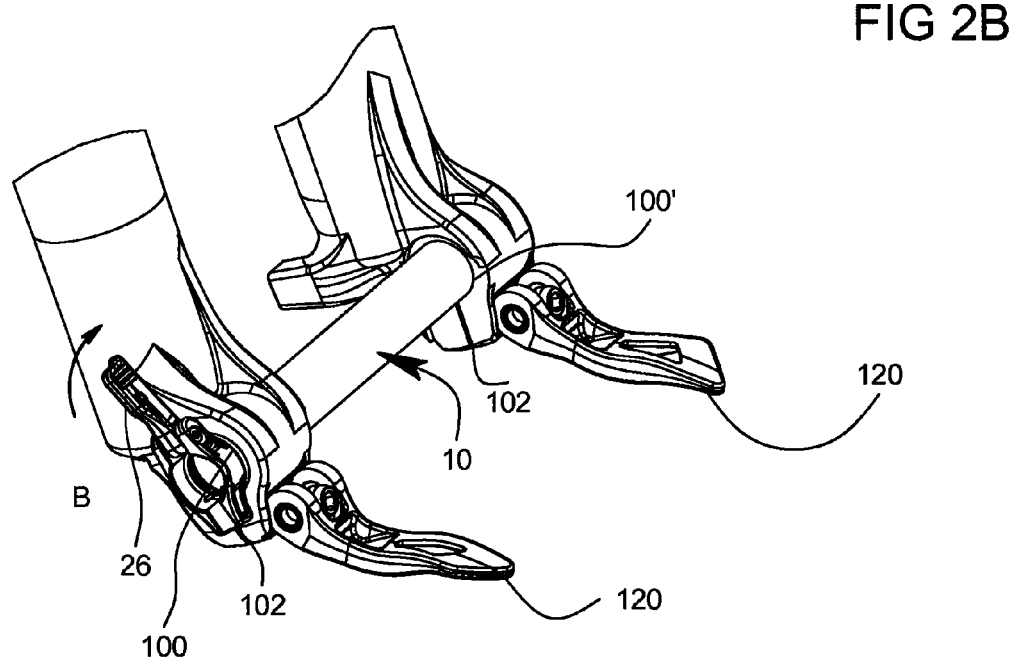
Figure 2C:
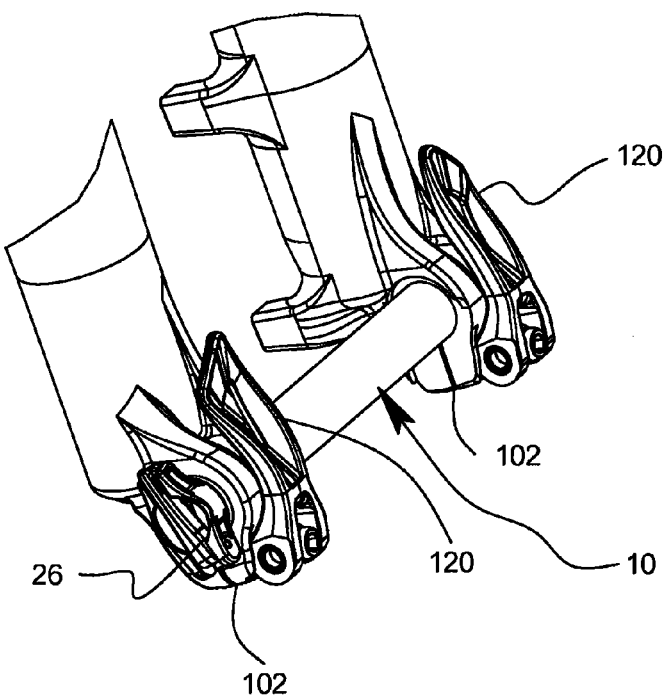

FIG. 2A-2C depict an exemplary use for the exemplary axle assembly 10 of FIG. 1 and in the form of a bottom portion of an exemplary bicycle suspension fork. For clarity, such conventional components as the upper portions of the suspension fork, the tire, the wheel and other associated hardware have been omitted from FIGS. 2A-2C.

In FIG. 2A, the longitudinal axis of axle assembly 10 is aligned with the longitudinal axes of the dropouts 98, 99 of the suspension fork. In this exemplary embodiment, the dropouts 98, 99 include split-clamp pinch bearings 100, 100' in lower fork legs 110. Split-clamp pinch bearings 100, 100' substantially surround axle assembly 10 subject to small slits 102 formed by the space between opposing clamp ends 103, 103' that allow the diameters of the split-clamp pinch bearings 100, 100' to be varied to clamp or release axle assembly 10 within split-clamp pinch bearings 100, 100'.

Split-clamp pinch bearing 100 will have a completely smooth bearing-like surface finish for engagement with smooth bearing surface 21 of axle assembly 10. Split-clamp pinch bearing 100' will have a partially smooth bearing-like finish for engagement with bearing surface 20 of axle assembly 10 and threads 101 complementary to threads 19. In FIG. 2A, cammed clamp levers 120 are in their open position allowing slits 102 to expand to allow axle assembly 10 to be inserted into split-clamp pinch bearings 100, 100'.

In FIG. 2B, axle assembly 10 has been inserted through split-clamp pinch bearings 100, 100'. Axle assembly 10 is then rotated, using for example, lever 26 (see arrow B) or ergonomically shaped grip portion 22 until the complementary threads 101 of split-clamp pinch bearing 100' capture axle threads 19. This may take approximately 2-3 turns of axle body 11 depending upon the pitch and length of the complementary threads 19, 101. Typically, the rider can feel when the axle threads 19 and the pinch bore threads 101 have become properly engaged.

In FIG. 2C, cammed clamp levers 120 are in their locked positions thereby decreasing the sizes of slits 102 by forcing opposing clamp ends 103, 103' towards each other. This clamps axle assembly 10 within each of the split-clamp pinch bearings 100, 100'. Clamping prevents axle assembly 10 from un-threading itself when the fork and axle assembly 10 are subjected to various forces. Finally, lever 26 may be pivoted into its stowed position in lever recess 26'. When lever 26 is stowed within lever recess 26', lever 26 will be substantially flush with the surface of the grip portion 22.

While the previous discussion has been in the context of installing the axle assembly 10, one skilled in the art would recognize that in the context of un-installing the axle assembly 10, the above process would merely be reversed.

Exemplary Method of Making the Axle

Figure 3:
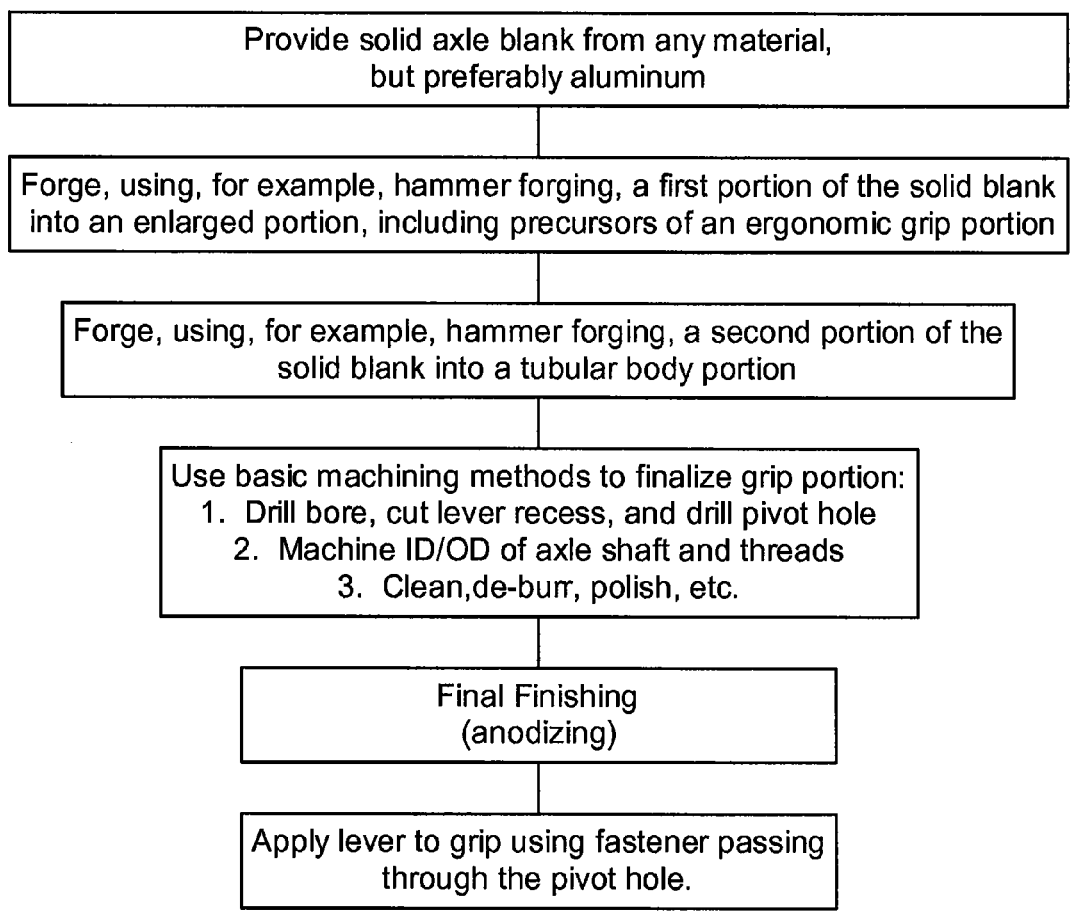
FIG. 3 is a high-level block diagram indicating an exemplary method for making the exemplary axle of FIG. 1.

FIG. 3 is a block diagram depicting the major steps of an exemplary method for making the exemplary axle assembly 10 whose structure and use are described herein. As previously mentioned, most typically, the axle will be made from a metallic material, such as aluminum. Accordingly, a blank, such as a solid aluminum work piece, is provided.

Figure 4A:
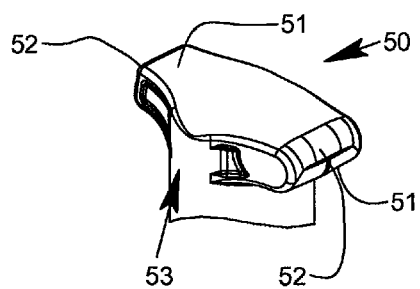
FIG. 4A and FIG. 4B depict the enlarged portion of the axle body after the first forging step.
Figure 4B:
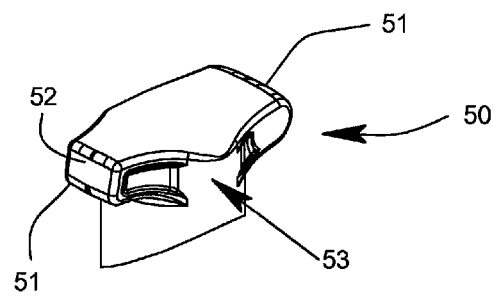

Using, for example, conventional hammer forging machinery (not shown), a first portion of the solid blank will be forged into a solid enlarged portion 50 (see FIGS. 4A, 4B). Enlarged portion 50 will be shaped by the forging process to have the basic physical characteristics of finished grip portion 22, as described above. For example, solid enlarged portion 50 will be shaped by forging to have wing precursors 51, wing end precursors 52, and sweepingly curved side surface precursors 53.

Figure 5A:
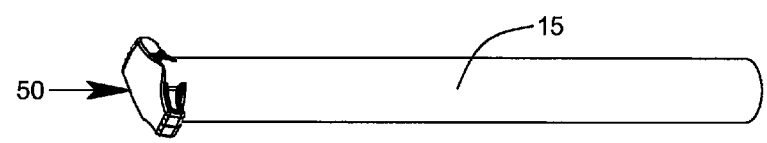
FIG. 5A and FIG. 5B depict solid and cross-sectional views, respectively, of the axle body after the second forging step
Figure 5B:
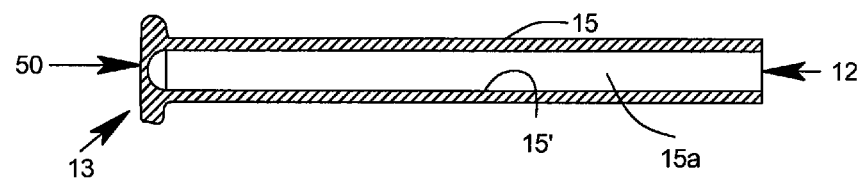

Then, again using conventional hammer forging (or impact extrusion) machinery (not shown), a second portion of the same solid blank will be formed into tubular body portion 15. This early form of axle body 11 will have inner walls defining a through bore 15', but the through bore 15' will be closed off at second end 13 and enlarged portion 50 and open at first end 12 (See FIGS. 5A, 5B), i.e., axle body 11 is not yet open at both ends 12, 13.

Note that it may be possible to combine the two forging steps into one depending upon, for example, part complexity and sophistication of available machine shop equipment.

After forging, enlarged portion 50 is finally formed into finished grip portion 22, shaped as previously described above. To achieve this, the most basic 2D machining methods can be used to finish manufacturing axle body 11. No complex 3D surface machining methods, which are typically expensive and tedious to program and implement, are needed. Additionally, if solid billet material was used according to prior art methods, a large amount of time would be spent removing material to achieve this axle diameter, due to the large diameter of the grip portion.

Thus, according to the exemplary method, for example, using conventional machine shop cutting tools, as shown in FIG. 6, the closed end of enlarged portion 50 can be opened up to form bore 55. This lightens axle body 11. Furthermore, again using simple end mills or woodruff-cutters, wing precursor 51, end precursor 52, and curved side precursor 53 will be machined into their final forms, which includes forming lever recess 26'. Similarly using a drill and tap, pivot bearing 31 and threaded pivot hole 32, for receiving pivot fastener 30, may be formed.

Figure 7:
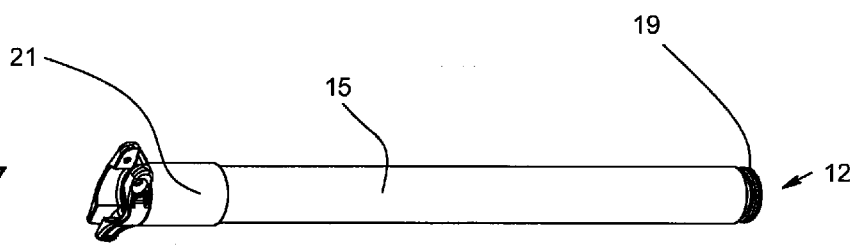
FIG. 7 depicts the complete axle (except for the lever) after final machining.

Then, the outer diameter of the bearing portion 21 and the outer diameter of tubular body portion 15 are smoothened and dimensioned using, for example, basic 2D machine tools (not shown) and threads 19 may be cut into the surface of axle assembly 10 at its first end 12 (FIG. 7). Also, retaining groove 27' for clip ring 27 will be machined.

Finally, before attaching lever 26 to grip portion 20 via fastener 30, axle assembly 10 may be cleaned, de-burred, polished, and anodized, as well as treated according to any other known mechanical or chemical processing methods. Additionally, clip ring 27 will be installed into clip ring retaining groove 27'.

CONCLUSION

While the invention has been described with respect to certain exemplary structural and method embodiments, the invention shall only be limited by the following claims.

List of Reference Numerals Used

| Reference | Numeral Item |
|---|---|
| A, B | angle of rotation |
| T | external tool |
| T' | tool receiving portion |
| 10 | axle |
| 11 | axle body |
| 12 | first end |
| 13 | second end |
| 15 | tubular body portion |
| 15a | through bore |
| 15' | inner wall |
| 16 | first bearing portion |
| 17 | second bearing portion |
| 19 | threads |
| 20 | bearing surface |

-continued

List of Reference Numerals Used

| Reference | Numeral Item |
|---|---|
| 21 | bearing surface |
| 22 | grip portion |
| 23 | wings |
| 24 | smoothened ends |
| 25 | arcuate edge surface |
| 26 | lever |
| 26' | lever recess |
| 27 | clip ring |
| 27' | clip ring retaining groove |
| 30 | fastener |
| 31 | pivot bearing |
| 32 | threaded pivot hole |
| 50 | solid enlarged portion |
| 51 | wing precursors |
| 52 | wing end precursors |
| 53 | side surface precursors |
| 55 | bore |
| 98, 99 | dropouts |
| 100, 100' | pinch bearings |
| 101 | threads |
| 102 | slits |
| 110 | lower fork legs |
| 120 | cammed clamp levers |

The invention claimed is:

1. A suspension for a two-wheeled vehicle, comprising:
first and second fork legs, each fork leg comprising an opening therethrough,
wherein at least a portion of one of the openings is threaded, and
wherein each of the fork legs further comprise:
a split-clamp pinch bearing defining at least a portion of the opening and operable between an open position and a locked position, and
a hand operable actuator pivoted to the bearing for operation thereof; and
a one piece continuous axle disposed through the openings in the fork legs, the axle having a threaded first end of a first diameter engaged with the threaded portion of the opening in one of the fork legs and a second end having a larger diameter the threaded first end of the axle engaged with the opening in the other of the fork legs,
wherein the bearing tightly engages an outer surface of the axle in the locked position,
a grip portion disposed on the second end of the axle having outwardly extending wings having a recess within each wing within which a tool for providing rotational movement to the axle may be disposed.

2. The suspension of claim 1, wherein the bearing is a bearing surface.

3. The suspension of claim 1, wherein the tool comprises a lever pivotably connected within one of the wings.

4. The suspension of claim 3 wherein the lever is pivotable from a first position extending over and crossing the longitudinal axis of the axle wherein the lever extends inwardly of both wings.

5. The suspension of claim 3 wherein the lever is pivotable within the one of the wings wherein the lever extends outwardly from the one wing into a position for use to rotate the axle.

6. The suspension of claim 1, wherein the recesses in the wing form a tool receiving portion for an external tool.

7. A suspension for a two-wheeled vehicle, comprising:
first and second fork legs, each fork leg comprising a dropout, each dropout having an opening therethrough, wherein at least a portion of one of the openings is threaded, and wherein at least one of the dropouts comprises:
- a split-clamp pinch bearing defining at least a portion of the opening and operable between an open position and a locked position, and
- a hand operable actuator pivoted to the bearing for operation thereof;

an axle disposed through the openings, the axle having a threaded first end engaged with the threaded portion and a second end, wherein the bearing tightly engages an outer surface of the axle in the locked position, thereby rotationally coupling the axle to the dropout; and a lever having opposed ends and connected at the second end thereof to a fixed pivot point on the second end of the axle at a location on the second end of the axle offset from the center of the of the diameter of the axle and positionable relative to the axle in at least a first position extending across the second end of the axle for stowage thereof and a second position extending away from the second end of the axle for imparting rotational movement to the axle.

8. The suspension of claim 7, wherein the second end of the axle has a recess for stowing the lever when the lever is in the first position.

9. The suspension of claim 7, wherein the second end of the axle includes a pair of opposed wings extending outwardly to the sides of the axle.

10. The suspension of claim 9, wherein the wings each include a gap therein which forms a stowage slot for receipt of the lever in the stowage position.

11. The suspension of claim 7, wherein the second end of the axle has a larger diameter than the first end of the axle.

12. The suspension of claim 7, wherein the recess includes a clip to releasably secure the lever therein when the lever is in the stowed position.

13. An axle configured for receipt in at least two spaced bores, comprising:
- a single piece tubular member having a first end and a second end and an outer circumferential surface, the outer circumferential surface having a first diameter at the first end of the axle and a second, larger, diameter adjacent the second end of the axle;
- the outer circumferential surface including threads thereon extending inwardly of the first end;
- opposed first and second wings extending outwardly of the axle at the second end thereof, the wings extending further outwardly than the second diameter of the axle at the second end, each of the wings including a slot formed therein.

14. The axle of claim 13, further including a fastener extending across the slot in the first wing at a location of the wing outwardly of the diameter of the second end of the axle; and
- a lever having opposed first and second ends and connected at the second end thereof to the fastener.

15. The axle of claim 14, wherein the lever is positionable relative to the axle in at least a first position extending across the second end of the axle and received in the slot in the second wing for stowage thereof and a second position extending away from the second end of the axle for imparting rotational movement to the axle.

16. The axle of claim 14 wherein the axle includes an inner bore extending from the first end to the second end thereof, and the diameter of the bore adjacent to the second end is larger than the diameter of the bore adjacent to the first end.

17. The axle of claim 13, wherein the slots in the first and second wings are aligned and form a recess for receipt of an external tool therein.

18. The axle of claim 13, wherein the slots extend outwardly of the outer diameter of the second end of the axle.

19. The axle of claim 13, wherein the wings and axle are a single piece of material.

\* \* \* \* \*

UNITED STATES PATENT AND TRADEMARK OFFICE
CERTIFICATE OF CORRECTION

| | | |
|---|---|---|
| PATENT NO. | : 8,770,610 B2 | Page 1 of 1 |
| APPLICATION NO. | : 13/343338 | |
| DATED | : July 8, 2014 | |
| INVENTOR(S) | : Andrew Laird | |

It is certified that error appears in the above-identified patent and that said Letters Patent is hereby corrected as shown below:

In the Claims:

Column 8, Claim 16, Line 26, Please delete "14" and insert --15-- therefor.

Signed and Sealed this
Seventh Day of October, 2014

Michelle K. Lee
*Deputy Director of the United States Patent and Trademark Office*